United States Patent
Miheli et al.

(10) Patent No.: US 10,942,021 B2
(45) Date of Patent: Mar. 9, 2021

(54) SYSTEMS AND METHODS FOR IDENTIFYING A DIAMETER OF A SAMPLING POINT

(71) Applicant: Honeywell International Inc., Morristown, NJ (US)

(72) Inventors: Mauro Miheli, Trieste (IT); Marco Causero, Trieste (IT); Jochen Hahn, Moenchengladbach (DE)

(73) Assignee: Honeywell International Inc., Charlotte, NC (US)

( * ) Notice: Subject to any disclaimer, the term of this patent is extended or adjusted under 35 U.S.C. 154(b) by 300 days.

(21) Appl. No.: 16/000,194

(22) Filed: Jun. 5, 2018

(65) Prior Publication Data
US 2019/0368854 A1    Dec. 5, 2019

(51) Int. Cl.
*G01B 5/12*    (2006.01)

(52) U.S. Cl.
CPC ...................... *G01B 5/12* (2013.01)

(58) Field of Classification Search
CPC ........................................ G01B 5/12
USPC ........................................ 33/555.1
See application file for complete search history.

(56) References Cited

U.S. PATENT DOCUMENTS

| | | |
|---|---|---|
| 6,143,090 A | 11/2000 | Lietz |
| 6,708,782 B1 * | 3/2004 | Turney ................ E21B 7/067 175/40 |
| 2004/0074100 A1 * | 4/2004 | Polk, Jr. ................. F24F 1/34 33/562 |
| 2007/0008157 A1 | 1/2007 | Siemens et al. |
| 2009/0267345 A1 | 10/2009 | Choi |
| 2011/0017026 A1 | 1/2011 | Chang |
| 2012/0242080 A1 | 9/2012 | Nezu |
| 2015/0379846 A1 * | 12/2015 | Bressanutti .......... G08B 17/113 340/630 |
| 2016/0115781 A1 * | 4/2016 | Douglas ................ E21B 47/08 33/544 |
| 2019/0358762 A1 * | 11/2019 | Lause .................. B23Q 17/225 |
| 2020/0080829 A1 * | 3/2020 | Swenson, Jr. ............ G01B 3/46 |

FOREIGN PATENT DOCUMENTS

| | | |
|---|---|---|
| CN | 101421762 | 4/2009 |
| CN | 104200605 | 12/2014 |
| DE | 19605842 C1 | 4/1997 |
| DE | 29905039 U1 | 6/1999 |

OTHER PUBLICATIONS

Aspirating smoke detectors, AMX4004, © Viking GmbH & Co. KG, www.viking-emea.com, Oct. 31, 2017.

(Continued)

*Primary Examiner* — George B Bennett
(74) *Attorney, Agent, or Firm* — Brooks, Cameron & Huebsch, PLLC

(57) ABSTRACT

Systems and methods for identifying a diameter of a sampling point on a pipe within an aspirated smoke detector system are provided. Such systems and methods may include a clip having a body portion configured to circumscribe a surface of a circumference of a pipe, an opening defined by, extending through, and surrounded by the body portion, and size indicating indicia affixed to the body portion that visually identifies a size of the opening.

19 Claims, 2 Drawing Sheets

(56) References Cited

OTHER PUBLICATIONS

Smoke Extraction System—Titanus PRO Sens, BOSCH Security Systems, www.boschsecuritysystems.com, Oct. 31, 2017.
Extended Search Report from related European Patent Application No. 19177747, dated Oct. 23, 2019, 8 pages.
Chinese Office Action & Search Report for related Chinese Application No. 201910471533.0, dated Oct. 12, 2020 (7 pgs) & English Translation of Search Report (3 pgs); Total: 10 pgs.

* cited by examiner

SYSTEMS AND METHODS FOR IDENTIFYING A DIAMETER OF A SAMPLING POINT

FIELD

The present invention relates generally to an aspirated smoke detector system. More particularly, the present invention relates to systems and methods for creating and identifying diameters of sampling points on a plurality of pipes within the aspirated smoke detector system.

BACKGROUND

A known aspirated smoke detector system requires a distributed pipe network with multiple sampling points. The sampling points may include holes having diameters of different sizes to be drilled into pipes of the pipe network to ensure proper functioning of the aspirated smoke detector system. However, the pipes are often deployed directly underneath a ceiling, which can visually obscure the pipes from an installer attempting to view or identify a size of a hole.

In view of the above, there is a continuing, ongoing need for improved systems and methods.

DETAILED DESCRIPTION

Figure 1A:
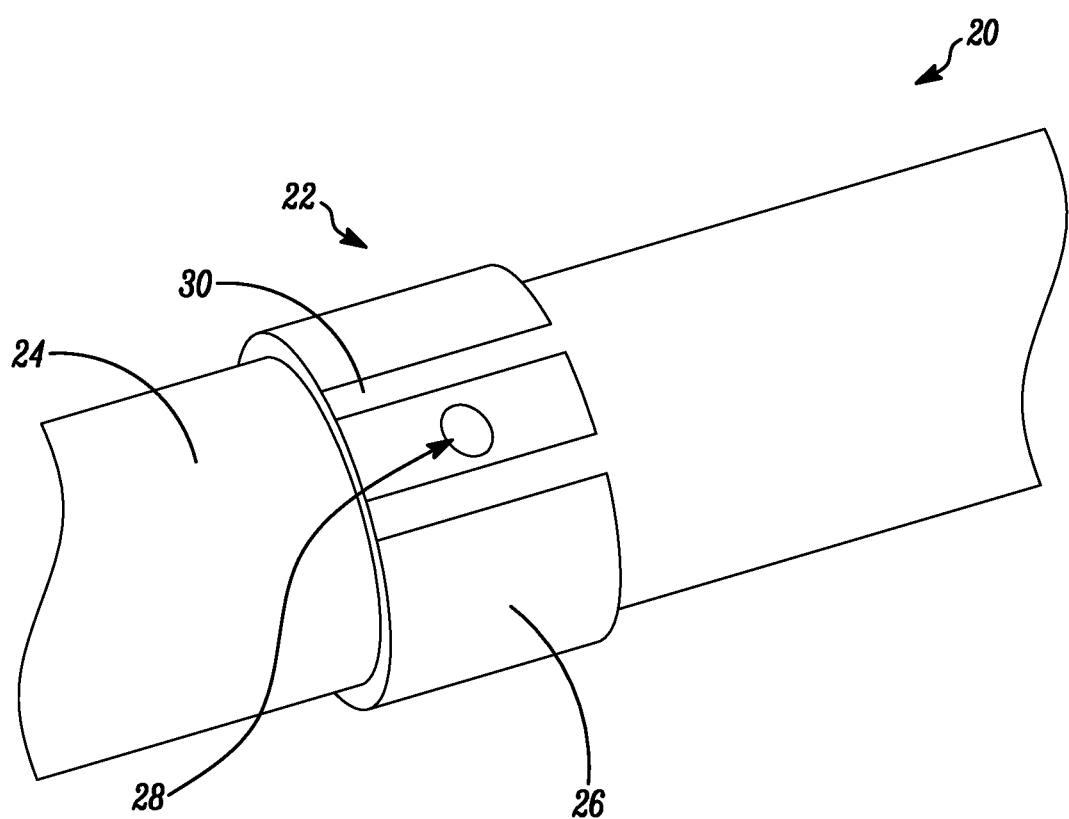
FIG. 1A is a perspective view of a clip and a pipe in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein may include systems and methods for identifying a diameter of a sampling point on a pipe within an aspirated smoke detector system. For example, systems and methods disclosed herein may include a clip for circumscribing at least a portion of a circumference of the pipe at a location along a length of the pipe at which a standard size hole (sampling point) in the pipe is located. In some embodiments, the standard size hole can include a diameter of 10 mm. Additionally or alternatively, the clip can alter the standard hole to a different diameter and a size indicating indicia can identify the altered hole diameter.

In accordance with disclosed embodiments, the clip may include a body portion configured to grip or affix to a surface of the circumference of the pipe, an opening defined by, extending through, and surrounded by the body portion, and size indicating indicia on at least a portion of the body portion. In some embodiments, the size indicating indicia may visually identify a size of the opening, such as a diameter thereof, and, therefore, a size (diameter) of the hole in the pipe at the location of the clip on the pipe. That is, in some embodiments, the size of the opening in the clip may match the size of the hole in the pipe.

In some embodiments, the body portion of the clip may tension grip the pipe. Additionally or alternatively, in some embodiments, the clip may friction grip the pipe. Additionally or alternatively, the clip may be coupled to the pipe in any manner as would be known and understood by one of ordinary skill in the art.

In some embodiments, the size indicating indicia may include a color representative of the size of the opening in the clip and, therefore, the size of the hole in the pipe at the location of the clip on the pipe. For example, the color red can represent the size of 1 inch, and the color blue can represent the size of 2 inches. In some embodiments a second size indicating indicia can be included to indicate intermediate dimensions of the opening in the clip. For example, the first or main size indicating indicia can be blue to indicate a primary dimension of 6 mm and the second size indicating indicia on a tab of the clip can be blue to indicate the opening is an additional 0.5 mm in diameter for a total diameter or 6.5 mm. Additionally or alternatively, in some embodiments, the size indicating indicia may include a symbol representative of the size of the opening in the clip and, therefore, the size of the hole in the pipe at the location of the clip on the pipe. Additionally or alternatively, in some embodiments, the size indicating indicia may include a combination of the symbol and the color, such as the symbol having the color, representative of the size of the opening in the clip and, therefore, the size of the hole in the pipe at the location of the clip on the pipe.

In some embodiments, the size indicating indicia on the clip may be selected from and/or compared to a reference table that identifies the size of the opening in the clip represented by the size indicating indicia. In some embodiments, the table may include separate entries for a first size indicating indicia and a second size indicating indicia used to indicate intermediate measurements.

Figure 1B:
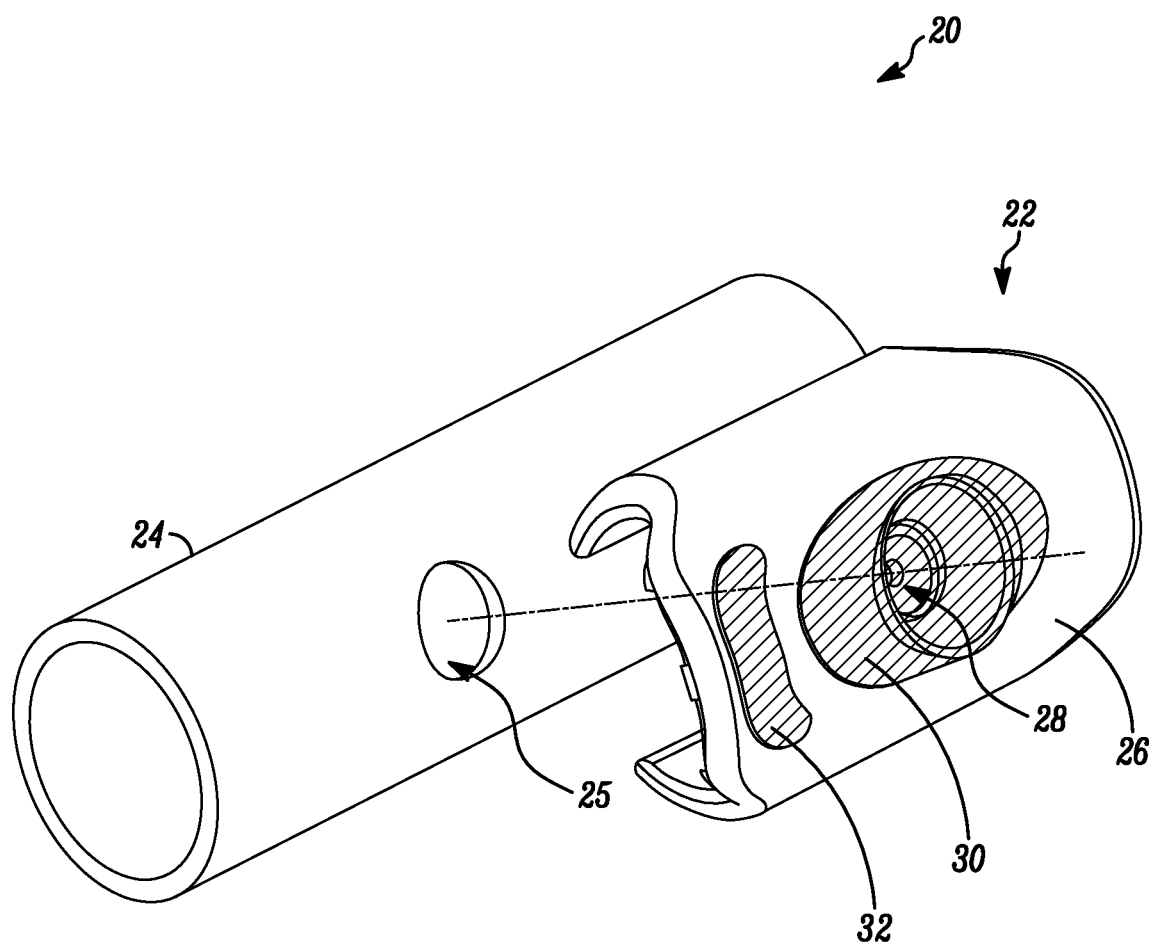
FIG. 1B is a perspective view of a clip and a pipe in accordance with disclosed embodiments.

FIG. 1A and FIG. 1B are a perspective view of a system 20 in accordance with disclosed embodiments. As seen, the system 20 may include a clip 22 coupled to a pipe 24. The clip 22 may include a body portion 26 configured to grip a surface of a circumference of the pipe 24, an opening 28 defined by, extending through, and surrounded by the body portion 26, and size indicating indicia 30 on a portion of the body portion 26 that visually identifies a size of the opening 28 and, therefore, a size of at least one pre-drilled hole 25 in the pipe 24 existing at a location of the clip 22 on the pipe 24. The opening 28 can provide a flow channel into and out of the at least one pre-drilled hole 25. In some embodiments, the body portion 26 and the opening 28 can alter a size of the pre-drilled hole 25. For example, the body portion 26 and the opening 28 can reduce the diameter of the pre-drilled hole 25. In some embodiments, the clip 22 can include a tab 32 which can include a second size indicating indicia used to document intermediate sizes of the opening 28.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A clip comprising:
   a body portion configured to circumscribe a surface of a circumference of a pipe of an aspirated smoke detector system including at least one pre-drilled hole;
   an opening defined by, extending through, and surrounded by the body portion; and
   size indicating indicia affixed to the body portion,
   wherein the size indicating indicia visually identifies a first size of the opening, second size indicating indicia affixed to the body portion,
wherein the second size indicating indicia visually identifies intermediate dimensions of the first size of the opening, and
wherein the opening provides a flow channel into and out of the at least one pre-drilled hole.

2. The clip of claim 1 wherein the body portion is configured to tension grip the surface of the circumference of the pipe.

3. The clip of claim 1 wherein the body portion is configured to friction grip the surface of the circumference of the pipe.

4. The clip of claim 1 wherein the size indicating indicia is selected from a reference table of a plurality of size indicating indicia and a plurality of sizes.

5. The clip of claim 1 wherein the size indicating indicia includes a color representative of the size of the opening.

6. The clip of claim 1 wherein the size indicating indicia includes a symbol representative of the first size of the opening.

7. The clip of claim 1 wherein the size indicating indicia includes a combination of a symbol and a color representative of the first size of the opening.

8. The clip of claim 1 wherein the first size includes a diameter.

9. The clip of claim 1 wherein the opening and the body portion alter a second size of the pre-drilled hole.

10. A system comprising:
   a pipe of an aspirated smoke detector system including at least one pre-drilled hole; and
   a clip that includes a body portion circumscribing a surface of a circumference of the pipe, an opening defined by, extending through, and surrounded by the body portion, a first size indicating indicia affixed to the body portion that visually identifies a first size of the opening, and second size indicating indicia affixed to the body portion, wherein the second size indicating indicia visually identifies intermediate dimensions of the first size of the opening, and
   wherein the opening provides a flow channel into and out of the predrilled hole.

11. The system of claim 10 wherein the body portion tension grips the surface of the circumference of the pipe.

12. The system of claim 10 wherein the body portion friction grips the surface of the circumference of the pipe.

13. The system of claim 10 wherein the size indicating indicia is selected from a reference table of a plurality of size indicating indicia and a plurality of sizes.

14. The system of claim 10 wherein the size indicating indicia includes a color representative of the first size of the opening.

15. The system of claim 10 wherein the size indicating indicia includes a symbol representative of the first size of the opening.

16. The system of claim 10 wherein the size indicating indicia includes a combination of a symbol and a unique representative of the first size of the opening.

17. The system of claim 10 wherein the first size includes a diameter.

18. The system of claim 10 wherein the first size matches a second size of the pre-drilled hole.

19. The system of claim 10 wherein the opening and the body portion alter a second size of the pre-drilled hole.

* * * * *